United States Patent
Jensen

[11] Patent Number: 6,148,224
[45] Date of Patent: Nov. 14, 2000

[54] APPARATUS AND METHOD FOR DETERMINING MOVEMENTS AND VELOCITIES OF MOVING OBJECTS

[75] Inventor: Jørgen Arendt Jensen, Lyngby, Denmark

[73] Assignee: B-K Medical A/S, Gentofte, Denmark

[21] Appl. No.: 09/222,773

[22] Filed: Dec. 30, 1998

Related U.S. Application Data

[63] Continuation of application No. PCT/DK97/00287, Jul. 1, 1997.
[60] Provisional application No. 60/021,101, Jul. 2, 1996.

[51] Int. Cl.[7] .................................................. A61B 8/06
[52] U.S. Cl. ..................... 600/407; 600/438; 600/419; 324/306
[58] Field of Search ................................ 600/407, 438, 600/443, 465, 419, 454, 455, 456, 437, 410; 324/306

[56] References Cited

U.S. PATENT DOCUMENTS

| | | |
|---|---|---|
| 4,265,126 | 5/1981 | Papadofrangakis et al. . |
| 4,327,739 | 5/1982 | Chmiel et al. . |
| 4,693,319 | 9/1987 | Amemiya . |
| 4,896,674 | 1/1990 | Seo . |
| 4,979,513 | 12/1990 | Sakai et al. . |
| 5,320,105 | 6/1994 | Bonnefous et al. ............... 128/661.08 |
| 5,349,960 | 9/1994 | Gondo . |
| 5,390,676 | 2/1995 | Katakura . |
| 5,810,731 | 9/1998 | Sarvazyan et al. ..................... 600/438 |

FOREIGN PATENT DOCUMENTS

| | | |
|---|---|---|
| 0 270 733 | 6/1988 | European Pat. Off. . |
| 0 430 093 | 6/1991 | European Pat. Off. . |
| 0 638 285 | 2/1995 | European Pat. Off. . |

OTHER PUBLICATIONS

German Brockhaus Enzyklopädie, vol. 18, pp. 22–23, (1992).

*Primary Examiner*—Marvin M. Lateef
*Assistant Examiner*—Eleni Mantis Mercader
*Attorney, Agent, or Firm*—Finnegan, Henderson, Farabow, Garrett & Dunner, L.L.P.

[57] ABSTRACT

With an apparatus according to the invention it is possible to detect an object's velocity transverse to the direction of propagation of an interacting field. Such transverse movement is detected by applying a field that oscillates spatially in the transverse direction. The method used in the apparatus is applicable where wave energy is used to sense or detect an object by its scattering properties when using either sound waves or electro-magnetic waves. The movement can be detected according to the field properties. The field represented by the sampling pulse must feature a spatial oscillation in the directions, where the velocity components are of interest. Such a transversely oscillating field is e.g. generated by using apodization on individual transducer elements and a special focusing scheme. The apparatus uses waves of either sound or electro-magnetic radiation.

16 Claims, 8 Drawing Sheets

APPARATUS AND METHOD FOR DETERMINING MOVEMENTS AND VELOCITIES OF MOVING OBJECTS

This application is a continuation of International Application No. PCT/DK97/00287, filed Jul. 1, 1997, the content of which is incorporated herein by reference which claimed priority of U.S. Provisional Application No. 60/021,101, filed Jul. 2, 1996.

FIELD OF THE INVENTION

The invention relates to an apparatus for determining the velocity vector of a remotely sensed object using either sound, in particular ultrasound, or electro-magnetic radiation. The movement of the object is determined from a field with spatial oscillations in one or two directions transverse to the axial direction. The invention is based on the principle of using transverse spatial oscillations for making the received signal influenced by transverse motion.

The combination of spatial oscillations and a sampling scheme makes it possible to estimate an inter sampling movement (phase shift) which is related to the different velocity components of the measurement setup.

The pulse scheme can either be done by emission of acoustic pulses (active transmit) reflecting on an object of investigation or by sampling a continuous signal emitted from an acoustic active object of investigation (passive transmit).

In the case of active transmit, using a number of consecutive pulse emissions, the inter pulse movement can be estimated and the velocity found from the estimated movement and the time between pulses.

BACKGROUND OF THE INVENTION

It is a common problem to measure the velocity of a moving object, where the object is observed through a probing field. An apparatus is used for emitting a pulsed field that is scattered or reflected by the moving object, and then received by a receiving transducer or antenna. Repeating the experiment yields signals that can be used in an algorithm for determining the velocity of the object.

Equipment of this kind is used in diagnostic medical ultrasound systems for measuring the velocity of blood flow non-invasively. Here a series of ultrasound pulses are emitted, and the scattered signal from the blood is measured as described by Baker (1970). The ultrasound signals will be displaced or offset in time according to the blood flow velocity and speed of sound, and the movement is detected by the apparatus, and the velocity is calculated from the time between pulses and the movement. The velocity can be displayed either as the velocity distribution as a function of time (spectrogram), or as a single velocity over time. This technique can also be used to display velocity images. Here the ultrasound beam is emitted a number of times in one distinct direction, and the velocities along that direction are found by dividing the received signal into segments and finding the velocities for the different depths. The direction is then changed. The measurement procedure is then repeated and the velocities found along these other directions. An image of velocity is then made, and continuously updated over time. The velocity can be found through an autocorrelation approach as described by Kasai et al. (1985) and Namekawa et al. (1982). Another technique is to use cross-correlation as described by Bonnefous et al. (1986). A general description of the systems can be found in Jensen (1996). In these methods the standard techniques for generating homogeneous and highly focused fields are used in order to obtain a highly focused image with a uniform appearance for all depths.

Radar systems also use the pulse principle for estimating velocity of a moving object. A series of radar pulses is emitted and the received signals are measured. The signals from a specific distance are compared and the velocity is calculated from the movement of the object between pulses, the speed of light, and the time between pulse emissions. This is, e.g., used for finding the velocity of airplanes, missiles, or ships, as described by Skolnik (1980).

The pulse movement principle has also been employed in sonar for finding the velocity of different objects. This is done by the same methods as mentioned above for medical ultrasound scanners with appropriate adaptations. One problem with all these velocity estimation techniques is that only the velocity component in the beam direction, i.e. towards or away from the transducer, can be found. Any velocity perpendicular to the beam propagation direction can not measured. A number of approaches have sought to remedy this in diagnostic medical ultrasound. Two consecutive ultrasound images are measured in the speckle tracking approach as described by Trahey et al. (1987). The movement of a region in a regional pattern from the one image to the next is found through two-dimensional cross-correlation, and the velocity vector for the region is determined from the displacement of the region and the time between the images. The technique needs two images, which makes data acquisition slow, and precludes the use of averaging. The image acquisition also makes this technique difficult to use for full three-dimensional velocity estimation. The two-dimensional correlation necessitates a high number of calculations, and erroneous velocities can evolve due to false maxima in the correlation function.

Another approach is to use two transducers or apertures emitting two beams crossing each other in the region of interest, whereby the velocity can be found in two independent directions. The velocity vector can then be found through a triangulation scheme. The variance and hence the accuracy of the transverse component of the velocity is affected by the angle between the two beams. The angle will be small at large depths in tissue, and a small angle will give a high variance, i.e. a low accuracy. The use of two transducers or a single large array also makes probing between the ribs of a person difficult, and can result in loss of contact for one of the transducers.

EP 0 638 285 A1 discloses an ultrasonic diagnostic apparatus which, based on the Doppler bandwidth, estimates amplitude and direction independently. The method is in principle based on the idea originally presented by Newhouse et al., "Study of vector flow estimation with transverse Doppler", *IEEE Ultrasonics Symposium*, pp. 1259–1263, (1991). U.S. Pat. No. 4,979,513, Sakai et al. discloses an ultrasonic diagnostic apparatus which estimates phase changes across the face of the transducer aperture, and the lateral velocity is found from the complex time demodulated radio-frequency signal.

SUMMARY OF THE INVENTION

It is the object of the invention to overcome this deficiency and disadvantage of the known kinds of apparatus. With the invention this object is achieved by an apparatus that uses a probing field that oscillates spatially in one or two directions transverse to the direction of propagation of the field. A laterally oscillating field is introduced in the medium and the moving scatterers are probed with both an in-phase and quadrature field giving rise to a complex spatial demodulation and to signals that oscillate corresponding to the lateral movement of the scatterers. The transverse movement and velocity can then be found by estimating the displacement in the transverse direction.

The spatial oscillation can be generated either by the emitted field or by the received field or by both, when using a beam forming technique whereby the sensitivity of the emitting transducer or the receiving transducer or both is/are made to oscillate spatially in a direction transversely to the direction of propagation of the field, which is the direction from the transducer. By spatial oscillation of the sensitivity is meant that at any fixed point in time, the sensitivity will vary in space with oscillations about a mean value.

In a first aspect of the invention, the estimation of movement and velocity is performed by emitting and receiving waves of energy or a signal in a field that oscillates spatially in a direction transverse to the beam direction. An object moving transversely to the direction of the beam will interact with the emitted field by reflecting or scattering the field energy, and the object will thus introduce a variation in the received signal as a function of time. Emitting a pulse and receiving the reflected or scattered signal and repeating this a number of times with a fixed time interval between pulse emissions then yields a signal affected by the transverse motion of the moving object. This effect makes it possible to measure velocity either in a plane or in space, when using a pulsed probing system.

In another aspect of the invention, the movement and velocity estimation is performed by receiving waves of energy, and arranging the receiving transducer to have its sensitivity oscillating spatially in a direction transverse to the direction from the transducer. An object moving transversely to the direction from the transducer and which itself emits signals that can be detected by the receiving transducer, such as sound or electro-magnetic signals, can be detected, and its direction of movement and its velocity can be estimated or calculated.

The received signals for a number of samples will also be affected by the movement in the direction of the beam. The velocity in the direction of the beam is therefore determined first, and that movement is compensated for in the received signal, so that only transverse movement gives rise to a variation in the compensated signal. Standard techniques can then be used for finding the velocity or the velocity distribution as used for a conventional system in the axial direction.

The transverse spatial oscillation of the field can be generated by a single array transducer by special beam forming during transmit and/or receive. A pulse of sinusoidal oscillations is emitted axially and properly apodized and phased during transmit and receive. Using, e.g., a non-focused emit beam and two sinc (sin(x)/x) functions for apodization in which different array transducer elements are given different vibration amplitudes along with plane wave focusing in receive beam forming give a resulting field oscillating spatially in the transverse direction. Having only receive beamforming also makes it possible to obtain a spatially oscillating field for all depths, as it is the receive beam forming that essentially generates the spatial oscillation.

The resulting transverse spatial oscillation of the field can be generated in a multitude of ways. The transmit and receive beam forming can be interchanged due to linearity, and that will generate a field with the same transverse spatial oscillation at a certain depth or distance from the transducer.

The transverse spatial oscillation can be generated through apodization or through steering parts of the beams so that they interact and generate the transverse spatial oscillation, or it can be a combination of the two. Many apodization schemes will lead to a spatial oscillation, the use of apodization functions with two separate peaks across the aperture being a typical example. The beam steering can be done either as plane waves interacting or as other forms of focusing at or near the depth for generating the transverse spatial oscillation.

For each beam generated, two measurements are taken at the depth of investigation, said two measurements being the in-phase and quadrature component of the received signal. Two beams are generated through focusing, each being 90 degrees out of phase for the transverse spatial oscillation. These two signals can then be used in a conventional estimator for finding the velocity estimate.

By using this approach a single transducer can be used for measuring the transverse velocity, which makes it convenient to perform measurements through a small aperture window.

By using two receive beams it is possible to detect the sign of the velocity.

By using the difference from measurement pulse to measurement pulse it is possible to significantly reduce the effect of distortion on the beam from the medium of propagation. The method, thus, only uses the difference from pulse to pulse to determine the velocity.

By reconstructing only two beams in receive, a very modest amount of calculations must be performed to estimate the perpendicular velocity.

By using a standard autocorrelation approach the apparatus will not be much affected by noise in the measurement process, since this estimator is unbiased for white noise.

By using a third beam forming, all the components of the velocity vector can be estimated.

BRIEF DESCRIPTION OF THE DRAWINGS

The invention will now be described in closer detail with reference to the drawings, where.

DESCRIPTION OF THE PREFERRED EMBODIMENT

Figure 1:
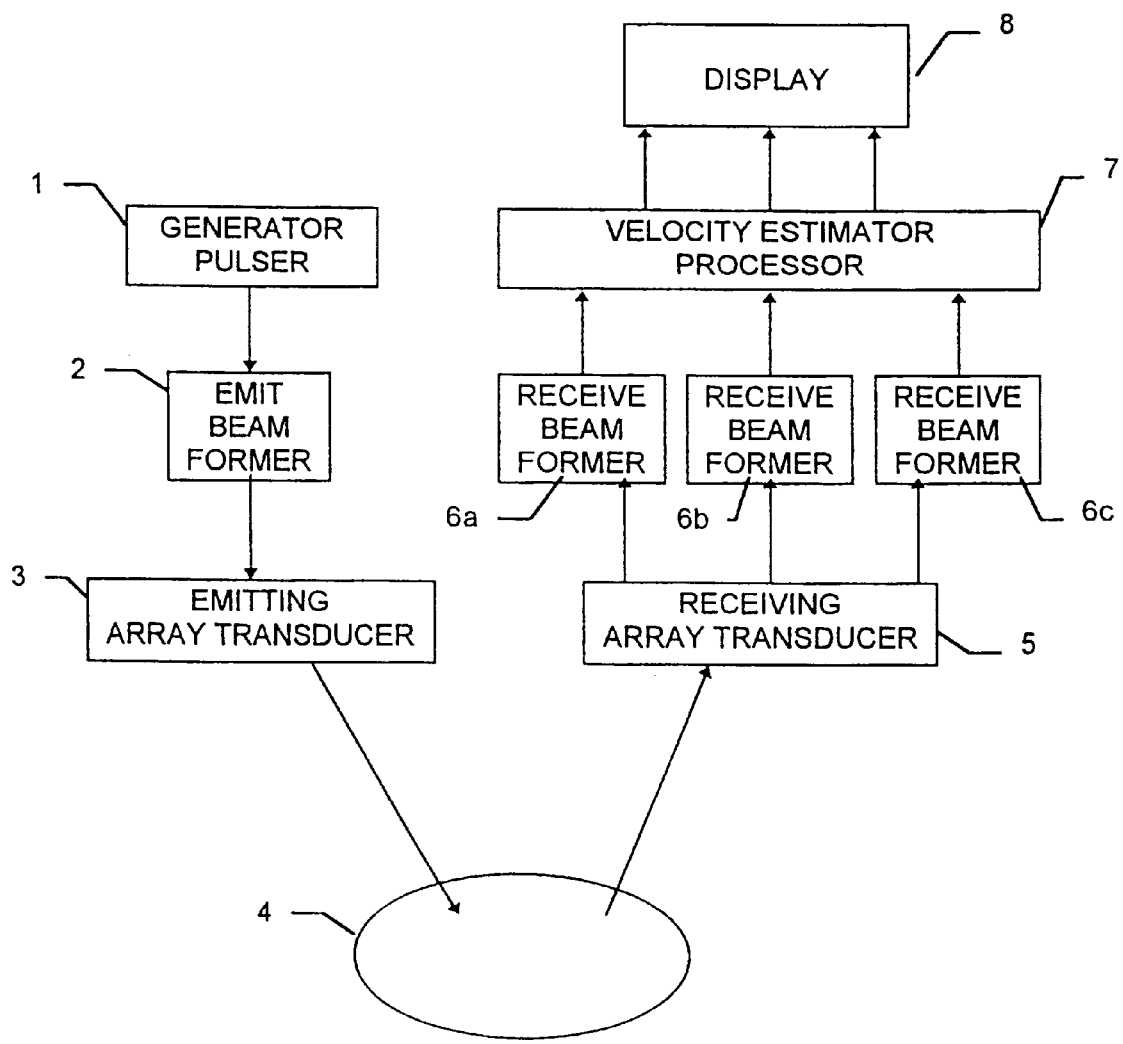
FIG. 1 shows schematically a block diagram of the main components of the system.

In FIG. 1. is shown an example of a preferred embodiment of an apparatus according to the invention. This embodiment of the invention has its application within diagnostic medical ultrasound for the measurement of blood flow velocity.

A typical example is the determination of blood flow in peripheral vessels such as arteries in an arm, a leg, or in the carotid artery. Another example is estimation of blood flow of a major vessel in the thorax, where only a small window or aperture between the ribs is available. In both examples the blood flow is substantially parallel to the surface, i.e. the person's skin, and consequently transverse to the direction of the probing field, when the probe is placed directly on the skin.

Figure 2:
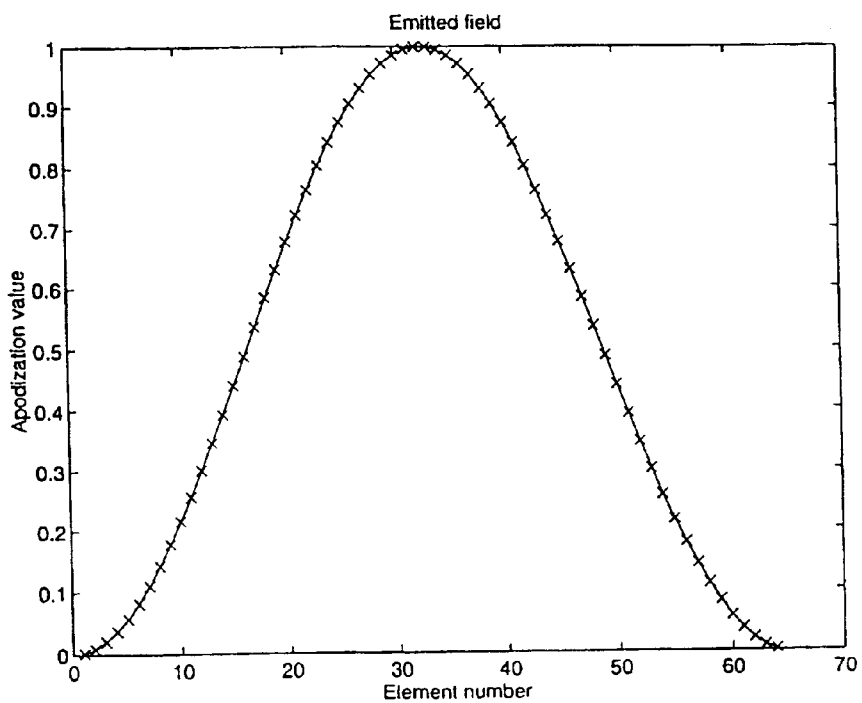
FIG. 2 shows the amplitude scaling factors or equivalently the apodization used for the emit beam former.

In FIG. 1 the specific setup of the measuring apparatus itself is indicated schematically. It comprises a generator or pulser 1, an emit beam former 2, a linear array ultrasound emitting transducer 3, a linear array ultrasound receiving transducer 5, three receive beam formers 6a, 6b and 6c working in parallel and receiving signals from the receiving transducer 5, a microcomputer 7 for controlling the operation of the apparatus and calculating or estimating the velocities, and a color display 8. The pulser 1 generates a pulsed voltage signal with eight sinusoidal oscillations at a frequency of 3 MHz in each pulse, that is fed to the emit beam former 2. The emit beam former 2 splits up the signal from the pulser into a plurality of signals which are being fed to the respective elements of the emitting transducer array 3. The emit beam former 2 is capable of individually attenuating and delaying the signals to each of the elements of the transducer array 3. In this embodiment no delay is introduced during emission and in FIG. 2 the attenuation values are shown as a function of element number in the transducer.

Figure 3:
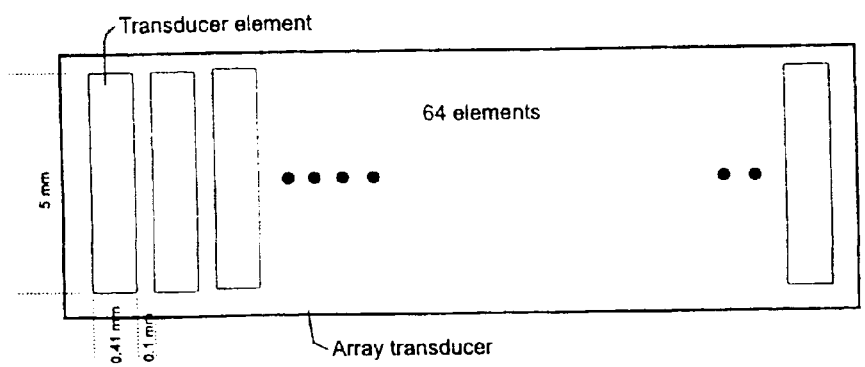
FIG. 3 shows a drawing of the linear array transducers used for emitting and also for receiving the field in the preferred embodiment.

In the preferred embodiment the same linear array transducer is used for both emitting and receiving the pulsed ultrasound field. It consists of 64 elements with an element width of 0.41 mm and a spacing between neighboring elements of 0.1 mm as shown in FIG. 3. The height of the elements is 5 mm.

Figure 4:
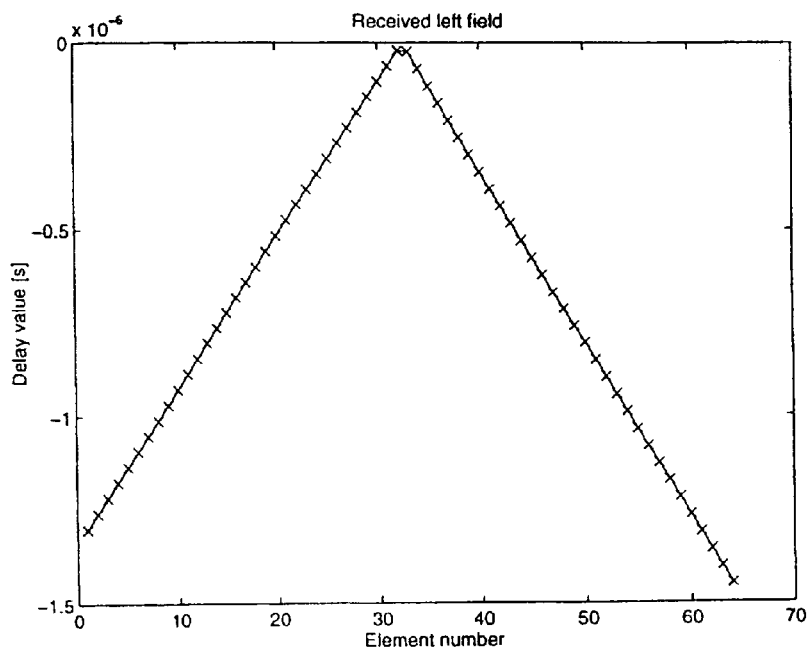
FIG. 4 shows the time delay values for each element of the receiving transducer array used when making the left received signal.
Figure 5:
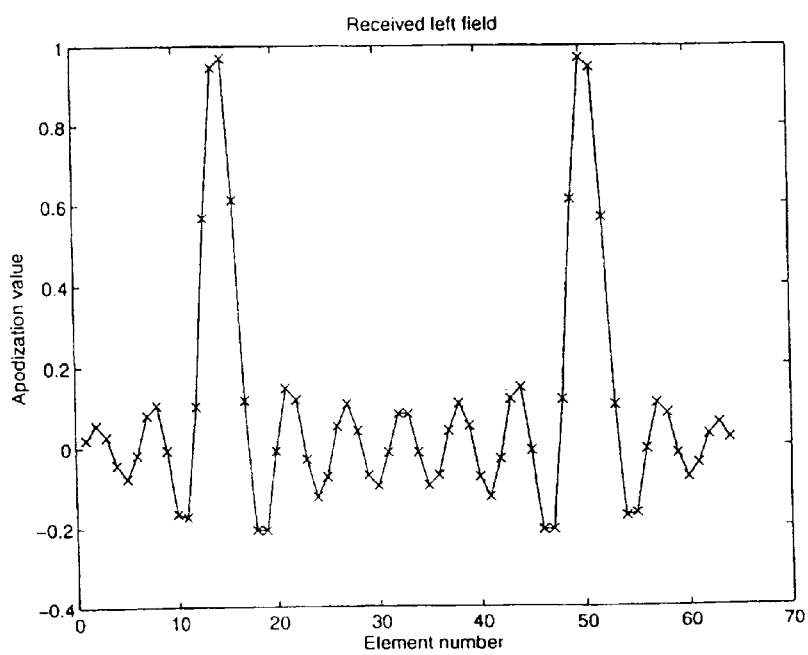
FIG. 5 shows the amplitude scaling factors for each element of the receiving transducer array used when making the left received signal.
Figure 6:
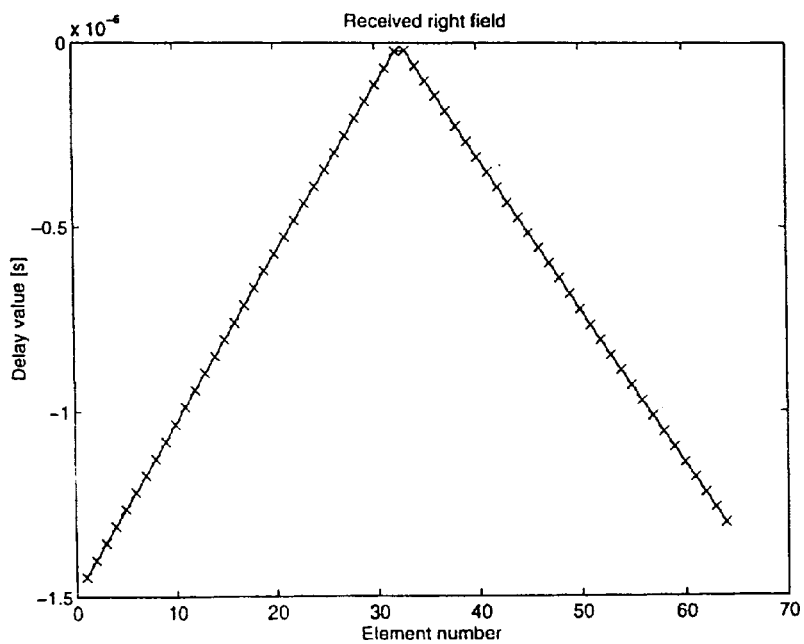
FIG. 6 shows the time delay values for each element of the receiving transducer array used when making the right received signal.
Figure 7:
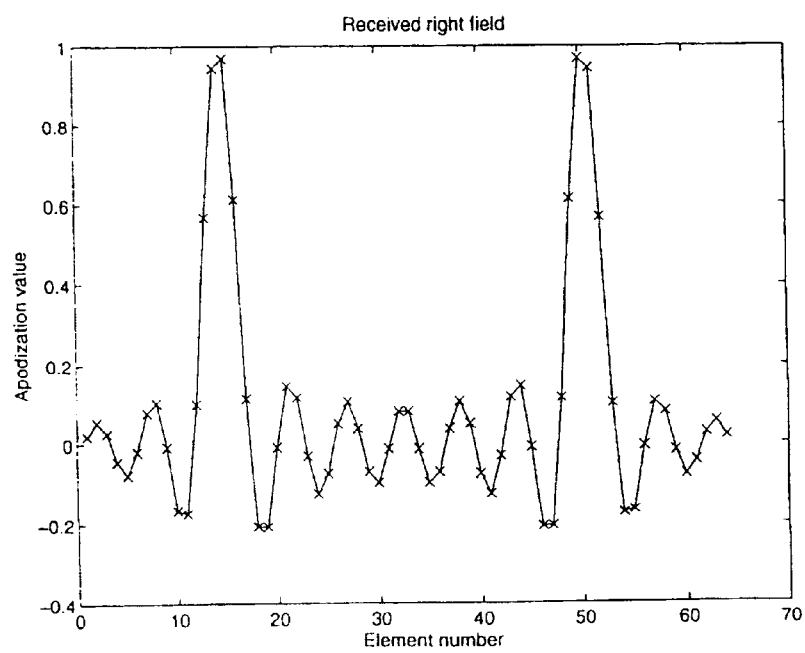
FIG. 7 shows the amplitude scaling factors for each element of the receiving transducer array used when making the right received signal.
Figure 8:
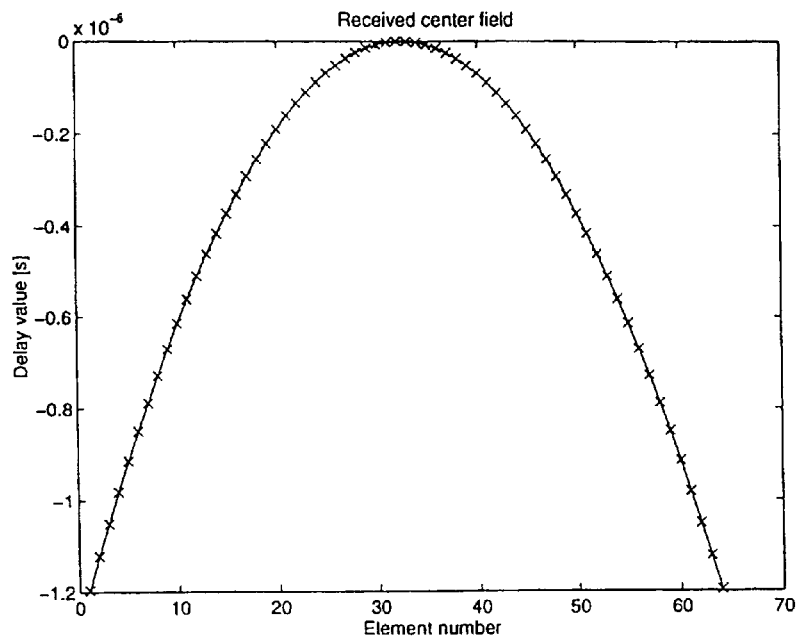
FIG. 8 shows the time delay values for each element of the receiving transducer array used when making the center received signal.
Figure 9:
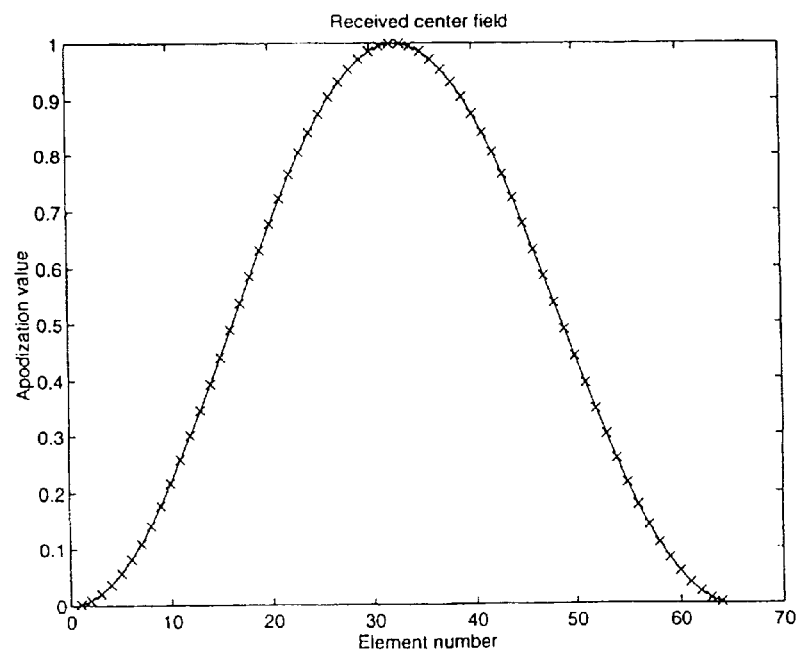
FIG. 9 shows the amplitude scaling factors for each element of the receiving transducer array used when making the center received signal.

The emitted field from the transducer is scattered by the blood in the blood vessel 4 and part of the scattered field is received by the linear array transducer, and the signals from the individual elements are passed on to two of the receive beam formers, i.e. 6a and 6b. The signals from the elements are individually scaled in amplitude and individually delayed and are thereafter summed to yield a single output signal from each receive beam former. The first receive beam former 6a generates the left signal and the second receive beam former 6b generates the right signal. In FIG. 4 the delay values are shown as a function of transducer element number, and in FIG. 5 the corresponding amplitude scaling factors are shown for the first receive beam former 6a. The delay values for the elements in the second receive beam former is shown in FIG. 6 and the corresponding amplitude scaling factors are shown in FIG. 7. The third receive beam former 6c generates the center signal with amplitude scaling factors shown in FIG. 8 and time delays in FIG. 9.

Figure 10:
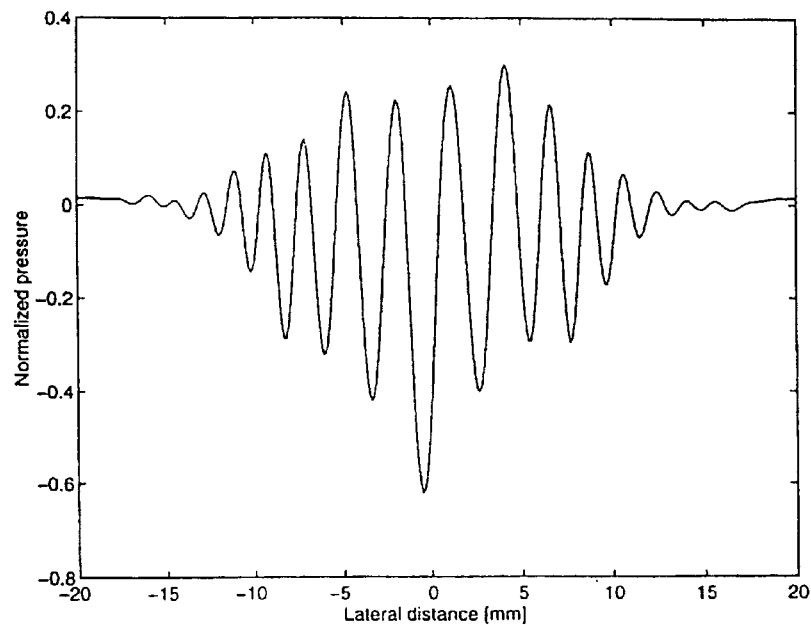
FIG. 10 shows the lateral spatial oscillation of the pulsed field used in the preferred embodiment.

Creating a field that oscillates spatially in the transverse direction of the propagation is consequently the basic element of the invention. The spatial oscillations are generated by the operation of the emit and/or the receive beam formers. They attenuate and delay the excitation signal to each individual transducer element in relationship to the others. This is called apodization. In transmit the delays are set to zero for all elements and the scaling factors are set to a Gaussian shape to reduce the sidelobes of the beam. The delays of the receive beam formers are operated so that two plane waves intersect each other at the place of investigation and the amplitude scaling is done with two sinc functions $(\sin(x-x_0)/(x-x_0))$, where x is the lateral position on the aperture and $x_0$ is the position of the center of the peak in the sinc function, one centered at each half of the aperture. This generates a pulse-echo field that oscillates spatially in the transverse direction suitable for the velocity estimation. This is documented through the simulation of the field from which the lateral oscillation is shown in FIG. 10.

The center signal is passed on to the axial velocity processor, which samples the signal at the time $t=2d/c$, where d is the depth in tissue (here equal to 70 mm) and c is the speed of sound taken to be 1540 m/s in soft tissue. A second quadrature sample is acquired at time $t=2d/c+1/(4f_0)$, where $f_0$ is the center frequency of the emitted pulse, here equal to 3 MHz. One set of samples is taken for each pulsed field received, and the samples for one line is denoted $x(i)$ and $y(i)$. Here i denotes the received sample number, where the first signal has then number $i=0$. Here 50 pulsed fields have been emitted and received, so that 50 samples are available. These samples are passed on to the axial velocity estimator. The axial velocity is found by using the equation:

$$v_z = -\frac{c}{4\pi T_{prf} f_0} \arctan\left(\frac{\sum_{i=0}^{N_c-2} y(i+1)x(i) - x(i+1)y(i)}{\sum_{i=0}^{N_c-2} x(i+1)x(i) + y(i+1)y(i)}\right)$$

where $T_{prf}$ is the time between pulse emissions from the array, and $N_c$ is the number of pulse-echo lines in the same direction used in the estimator.

The axial velocity is used for selecting the samples from the left and right signals from the two other beams formers. The samples taken from the left signals, denoted $g_l(t)$, are given by $$x_l(i) = g_l\left(\frac{2d}{c} - \frac{2v_z T_{prf}}{c} i\right)$$

so as to compensate for the influence from the axial movement of the blood. Correspondingly, samples taken from the right signals, denoted $g_r(t)$, is given by $$y_l(i) = g_r\left(\frac{2d}{c} - \frac{2v_z T_{prf}}{c} i\right).$$

These samples enter the estimator given by:

$$v_x = -\frac{c}{2\pi T_{prf} f_x} \arctan\left(\frac{\sum_{i=0}^{N_c-2} y_r(i+1)x_l(i) - x_l(i+1)y_r(i)}{\sum_{i=0}^{N_c-2} x_l(i+1)x_l(i) + y_r(i+1)y_r(i)}\right)$$

where $f_x$ is the frequency of the laterally oscillating transducer field at a depth of 70 mm in the soft tissue. $v_x$ is then the trans verse velocity.

Figure 11:
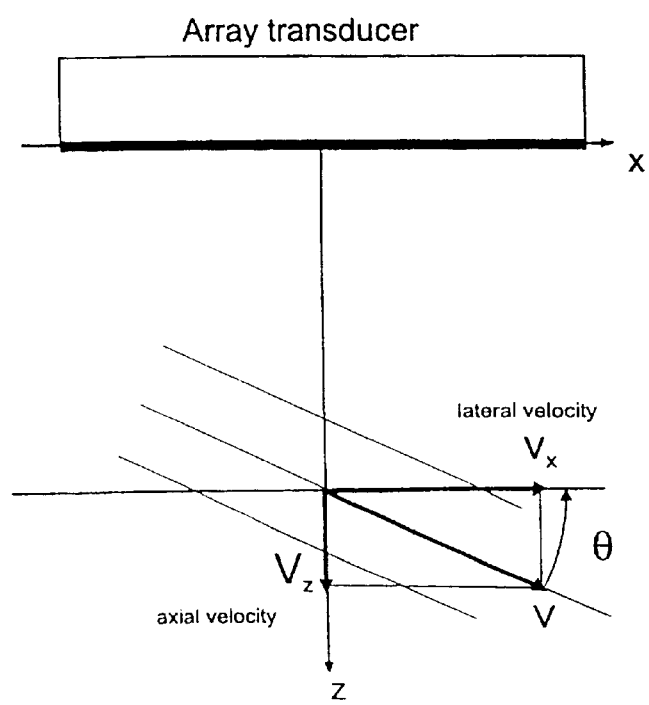
FIG. 11 shows the definition of axial and lateral velocity for the computer experiment.

The functionality of the apparatus is examined for two-dimensional velocity vector measurement. It is the vector situated in the image plane. The two directions are called the axial and the lateral velocity as shown in FIG. 11. The axial velocity is parallel to the direction of propagation of the pulse. The lateral velocity is perpendicular to the direction of propagation and is situated in the image plane. The image plane coincides with the center line of the linear array.

The functionality of the apparatus is experimentally documented by simulations. The simulation is performed using the impulse response method developed by Tupholme and by Stepanishen (Tupholme 1969; Stepanishen, 1970) in the implementation developed by Jensen and Svendsen (1992). The high accuracy of this approach, when compared to measurements, is described in Jensen (1991). The paper showed that the simulations were within 1% of the measured ultrasound fields. The simulation approach is applicable for pulsed fields and is used for three dimensional modeling the response of multiple scatterers.

Figure 12:
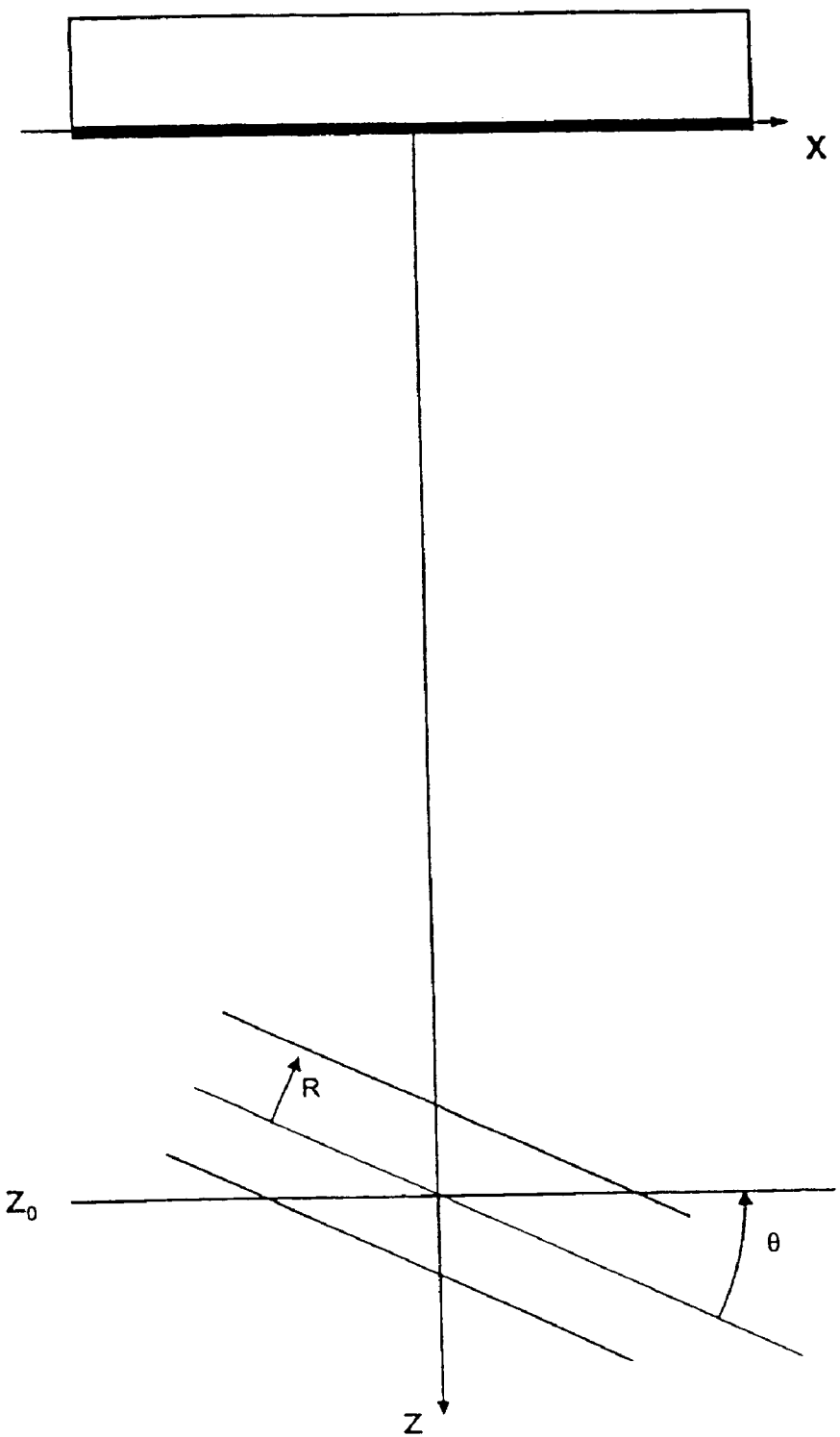
FIG. 12 shows the simulation setup.

The simulated situation is shown in FIG. 12. A vessel of 10 mm diameter is placed 70 mm from the center the transducer array, i.e. on the axis of the transducer. The vessel contains plug flow (all blood scatterers have the same velocity) and the 15,000 scatterers in the vessel have a Gaussian amplitude distribution with zero mean value and unit variance. This ensures fully developed speckle in the response from the blood model. The simulation is done for constant velocity of 1 m/s and a varying angle (Θ) for the flow vector. The angles used are 0, 15, 35, 55, 75, and 90 degrees.

Figure 13:
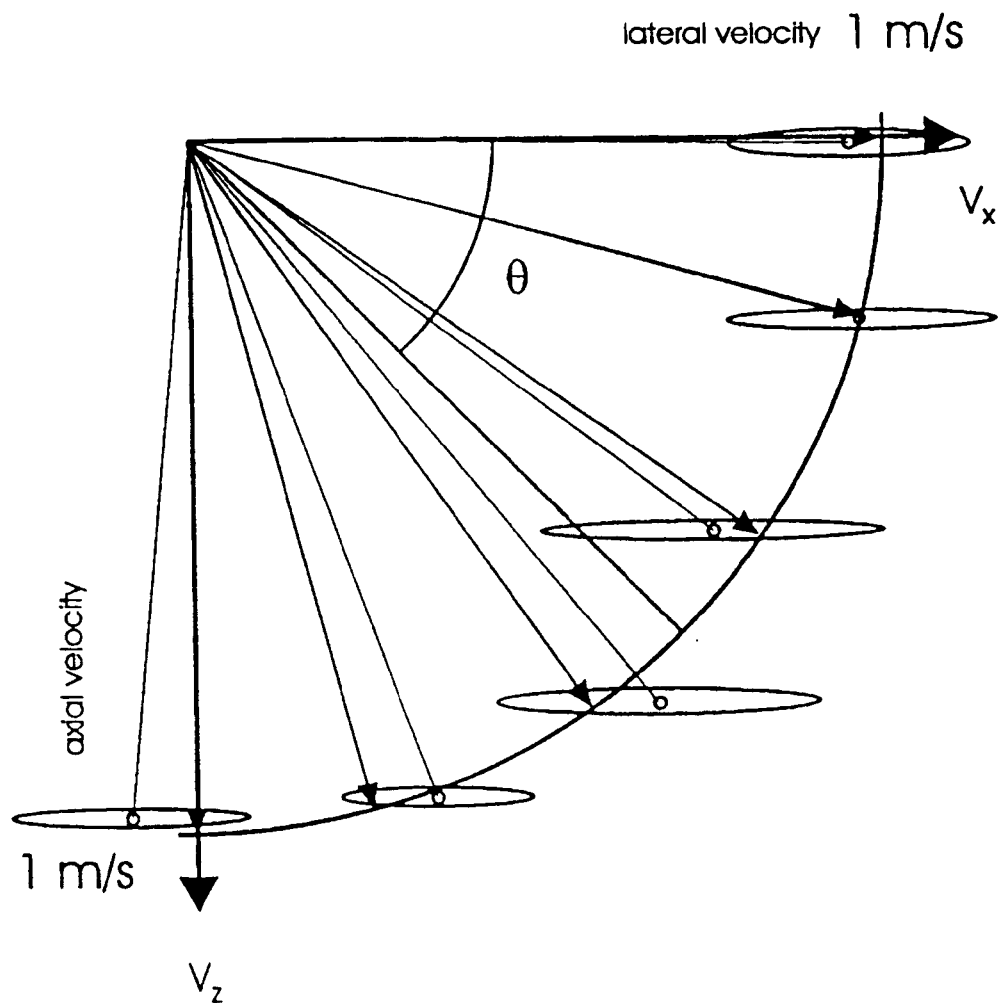
FIG. 13 shows the resulting velocities when using this embodiment.

The result of the simulation is shown in FIG. 13. The true velocity vectors are indicated by the individual arrows. The gray ellipses for each vector velocity estimate respectively indicate the standard deviation for both the axial estimation and the lateral estimation. The lateral standard deviation is the semi-major axis and the axial standard deviation is the semi-minor axis. The mean values are illustrated by the respective circles at the centers of the ellipses.

The velocity estimation has only been done at a fixed distance from the transducer in the apparatus. Due to the use of a non-focused field it is easy to dynamically change the focusing of the three receive beam formers to generate the spatially oscillating field at other depths for the same pulse emitted.

The apparatus described here only estimated the velocity in a plane, but it can easily be changed to give the full three dimensional velocity vector. A two-dimensional matrix transducer must then be used a described by Smith et al. (1990). The same emission field can be used since it is unfocused. An extra set of two receive beam formers must then be employed to make the velocity estimation in the y-direction perpendicular to both the z-and x-directions.

REFERENCES

D. W. Baker. Pulsed ultrasonic Doppler blood-flow sensing. *IEEE Trans. Son. Ultrason.*, SU-17:170–185, 1970.

C. Kasai, K. Namekawa, A. Koyano, and R. Omoto. Real-time two-dimensional blood flow imaging using an autocorrelation technique. *IEEE Trans. Son. Ultrason.*, 32:458–463, 1985.

K. Namekawa, C. Kasai, M. Tsukamoto, and A. Koyano. Realtime bloodflow imaging system utilizing autocorrelation techniques. In R. A. Lerski and P. Morley, editors, *Ultrasound '82*, pages 203–208, New York, 1982. Pergamon Press.

O. Bonnefous, P. Pesquè, and X. Bernard. A new velocity estimator for color flow mapping. In *Proc. IEEE Ultrason. Symp.*, pages 855–860, 1986.

J. A. Jensen. *Estimation of Blood Velocities using Ultrasound: A Signal Processing Approach.* Cambridge University Press, New York, 1996.

M. I. Skolnik. *Introduction to Radar Systems.* McGraw-Hill, New York, 1980.

G. E. Trahey, J. W. Allison, and O. T. von Ramm. Angle independent ultrasonic detection of blood flow. *IEEE Trans. Biomed. Eng.*, BME-34:965–967, 1987.

G. E. Tupholme. Generation of acoustic pulses by baffled plane pistons. *Mathematika*, 16:209–224, 1969.

P. R. Stepanishen. Transient radiation from pistons in an infinte planar baffle. *J. Acoust. Soc. Am.*, 49:1629–1638, 1971.

J. A. Jensen and N. B. Svendsen. Calculation of pressure fields from arbitrarily shaped, apodized, and excited ultrasound transducers. *IEEE Trans. Ultrason., Ferroelec., Freq. Contr.*, 39:262–267, 1992.

J. A. Jensen. A model for the propagation and scattering of ultrasound in tissue. J. Acoust. Soc. Am., 89:182–191, 1991.

S. W. Smith, H. G. Pavy, and O. T. von Ramm. High-speed ultrasound volumetric imaging system—Part I: Transducer design and beam steering. *IEEE Trans. Ultrason., Ferroelec., Freq. Contr.*, 38:100–108, 1991.

What is claimed is:

1. An apparatus for measuring the velocity of a moving object or a collection of moving objects in a region at a distance from the apparatus, the apparatus comprising:

a generator for generating excitation signals, an emitting transducer for transforming said excitation signals into wave energy and for emitting said wave energy in a direction of propagation towards said region, and a receiving transducer for receiving signals from said moving object or objects generated by interaction with said wave energy emitted from said emitting transducer, wherein said emitting transducer is arranged to emit wave energy in a field which, in said region, oscillates spatially in a direction transversely to said direction of propagation and/or said receiving transducer is arranged to have a sensitivity which, in said region, oscillates spatially in a direction transversely to said direction of propagation, thereby creating a probing field which, in said region, oscillates spatially in a direction transversely to said direction of propagation.

2. An apparatus according to claim 1 wherein said wave energy is pulsed wave energy.

3. An apparatus according to claim 1 wherein said wave energy is sound energy.

4. An apparatus according to claim 3 wherein said sound energy is ultrasound energy.

5. An apparatus according to claim 1 wherein said wave energy is electromagnetic energy.

6. An apparatus according to claim 1 wherein said emitting transducer is an array transducer including a plurality of emitting transducer elements.

7. An apparatus according to claim 6 further comprising an emit beam former for receiving said generating excitation signals and for supplying each of said plurality of emitting transducer elements with individual excitation signals each having a predetermined time delay relative to the others of said individual excitation signals.

8. An apparatus according to claim 7 wherein said individual excitation signals have time delays resulting in focused wave energy being emitted.

9. An apparatus according to claim 1 wherein said receiving transducer is an array transducer including a plurality of receiving transducer elements.

10. An apparatus according to claim 9 further comprising a receive beam former for receiving signals from said plurality of receiving transducer elements and for delaying each of said signals from said plurality of receiving transducer elements individually relative to the others of said signals from said plurality of receiving transducer elements.

11. An apparatus for measuring the velocity of a moving object or a collection of moving objects in a region at a distance from the apparatus, the apparatus comprising:

a receiving transducer for receiving signals from said moving object or objects wherein said receiving transducer has a receiving sensivity which, in said region, oscillates spatially in a direction transversely to a direction from said receiving transducer to said region.

12. An apparatus according to claim 11 wherein said signals are sound signals.

13. An apparatus according to claim 12 wherein said sound signals are ultrasound signals.

14. An apparatus according to claim 11 wherein said signals are electromagnetic signals.

15. An apparatus according to claim 11 wherein said receiving transducer is an array transducer including a plurality of receiving transducer elements.

16. An apparatus according to claim 15 further comprising a receive beam former for receiving signals from said plurality of receiving transducer elements and for delaying each of said signals from said plurality of receiving transducer elements individually relative to the others of said signals from said plurality of receiving transducer elements.

* * * * *